(12) United States Patent
Miry

(10) Patent No.: US 10,915,358 B2
(45) Date of Patent: Feb. 9, 2021

(54) SYSTEMS AND METHODS OF DATA ACQUISITION

(71) Applicant: SCHNEIDER ELECTRIC USA, INC., Andover, MA (US)

(72) Inventor: Jean-Marc Miry, Saint Ismier (FR)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 304 days.

(21) Appl. No.: 15/025,661

(22) PCT Filed: Sep. 30, 2013

(86) PCT No.: PCT/US2013/062703
§ 371 (c)(1),
(2) Date: Mar. 29, 2016

(87) PCT Pub. No.: WO2015/047411
PCT Pub. Date: Apr. 2, 2015

(65) Prior Publication Data
US 2016/0239342 A1 Aug. 18, 2016

(51) Int. Cl.
*G06F 9/48* (2006.01)
*G06F 9/50* (2006.01)
(Continued)

(52) U.S. Cl.
CPC .......... *G06F 9/5011* (2013.01); *G06F 9/4881* (2013.01); *G06Q 10/06* (2013.01);
(Continued)

(58) Field of Classification Search
CPC ..... G06F 9/5011; G06F 9/4881; G06Q 10/06; G06Q 10/0631; G06Q 50/06; Y02P 90/82
See application file for complete search history.

(56) References Cited

U.S. PATENT DOCUMENTS

| 8,194,914 B1 | 6/2012 | Skogg et al. |
| 2003/0063585 A1 | 4/2003 | Younis et al. |

(Continued)

FOREIGN PATENT DOCUMENTS

| CN | 1692317 A | 11/2005 |
| CN | 101430357 A | 5/2009 |

(Continued)

OTHER PUBLICATIONS

Digi International. XBee/XBee-PRO SE (Smart Energy) RF Modules. [online] (May 17, 2010). Digi International, Inc., pp. 1-133. Retrieved From the Internet <https://people.ece.cornell.edu/land/courses/ece4760/FinalProjects/s2011/kjb79_ajm232/pmeter/XBee%20SE%20Manual.pdf > (Year: 2010).*

(Continued)

*Primary Examiner* — Emerson C Puente
*Assistant Examiner* — Jonathan R Labud
(74) *Attorney, Agent, or Firm* — Lando & Anastasi, LLP

(57) ABSTRACT

According to various aspects and embodiments, an energy management system is provided. The system includes a memory, at least one processor coupled to the memory, and a data acquisition management component executable by the at least one processor and configured to generate a first request to perform at least one first managed task, the first request including an identifier of at least one asset and an identifier of an attribute of the at least one asset, transmit the first request to one or more data acquisition devices, receive a first response including information descriptive of a value associated with the attribute, and generate, in response to receiving the first response and in accord with at least one energy management goal, a second request to perform at least one second managed task.

20 Claims, 10 Drawing Sheets

(51) Int. Cl.
*G06Q 10/06* (2012.01)
*G06Q 50/06* (2012.01)

(52) U.S. Cl.
CPC ......... *G06Q 10/0631* (2013.01); *G06Q 50/06* (2013.01); *Y02P 90/82* (2015.11)

(56) References Cited

U.S. PATENT DOCUMENTS

| | | | |
|---|---|---|---|
| 2008/0117076 A1* | 5/2008 | Klaus | G01D 4/006 340/870.02 |
| 2009/0240380 A1 | 9/2009 | Shah et al. | |
| 2010/0283606 A1 | 11/2010 | Tsypin et al. | |
| 2010/0286937 A1 | 11/2010 | Hedley et al. | |
| 2011/0066299 A1 | 3/2011 | Gray et al. | |
| 2011/0183733 A1 | 7/2011 | Yoshida et al. | |
| 2011/0238232 A1 | 9/2011 | Tomita et al. | |
| 2012/0022700 A1 | 1/2012 | Drees et al. | |
| 2012/0084063 A1 | 4/2012 | Drees et al. | |
| 2012/0166616 A1 | 6/2012 | Meehan et al. | |
| 2013/0016175 A1 | 1/2013 | Alberth et al. | |
| 2013/0046695 A1* | 2/2013 | Acosta-Cazaubon | G06Q 50/06 705/63 |
| 2013/0050511 A1 | 2/2013 | Derby et al. | |
| 2015/0012147 A1* | 1/2015 | Haghighat-Kashani | G06Q 30/02 700/291 |

FOREIGN PATENT DOCUMENTS

| | | |
|---|---|---|
| CN | 102043389 A | 5/2011 |
| CN | 102136026 A | 7/2011 |
| EP | 2418620 A1 | 2/2012 |
| EP | 2455897 A2 | 5/2012 |
| WO | 2015069278 A1 | 5/2015 |

OTHER PUBLICATIONS

4 Innovative Startups that Lower Costs of Commerical Energy Audits / GreenBiz.com; 2013 GreenBiz Group; pp. 1-3.
ecoINSIGHT—It's Time to Give Excel a Rest—Goodbye cumbersome spreadsheets. Hello Better.; Auditor-Energy Audits! Energy Audit & Analysis; 2012 ecoInsight; pp. 1-2.
kWhOURS—FIELD for iPad; 2013 kWhOURS, Inc.; pp. 1-2.
Notification of Transmittal of the International Search Report and the Written Opinion of the International Searching Authority from corresponding PCT/US2013/062703 dated Jan. 7, 2014.
Extended European Search Report from corresponding European Application No. 13894822.9 dated Apr. 3, 2017.
IndoorAtlas Web page, Jul. 9, 2013, pp. 1-3.
Maile et al. (Building Energy Performance Simulation Tools—a Life-Cycle and Interoperable Perspective, 2007 (49 pages)).
Wikipedia—Outline of object recognition, Jul. 9, 2013, pp. 1-9.

* cited by examiner

SYSTEMS AND METHODS OF DATA ACQUISITION

CROSS-REFERENCE TO RELATED APPLICATIONS

This application is a U.S. National Stage Application under 35 U.S.C. § 371 of International Application No. PCT/US2013/062703, filed Sep. 30, 2013, titled SYSTEMS AND METHODS OF DATA ACQUISITION, which is hereby incorporated herein by reference in its entirety.

BACKGROUND

Technical Field

The technical field generally relates to energy management, and more particularly, to systems and methods for optimizing energy consumption of a facility.

Background Discussion

An important aspect of managing a facility's energy consumption is the ability for a facility energy manager to benchmark the facilities current consumption of utilities including Water, Air, Gas, and Steam (WAGES). Establishing such a baseline enables the tracking of reductions in WAGES consumption. In addition, the baseline may enable tools such as the Portfolio Manager provided online by the United States Environmental Protection Agency's (EPA) Energy Star program to determine the facility's relative efficiency. The Portfolio Manager is a tool that can be used to compare a particular facility's benchmark to other facilities of similar size, type, and function.

In addition, benchmarking helps in identifying how piped utilities are currently being used in a facility, setting clear and measurable goals, and developing a plan of action to implement these goals. Energy managers are increasingly concerned with reducing their facility's piped utilities however possible. In the case of electricity, cost is generally based on two measures: consumption and demand. The consumption component of electricity cost is a function of the amount of electricity, in kilowatt-hours (kWh), that a building consumes during a month. The demand component is a function of the peak demand (in kilowatts) occurring within the month, or for some utility providers, during the previous twelve months. Demand charges may range from a few dollars per kilowatt-month to upwards of twenty-dollars per kilowatt-month. For this reason, it is important to understand peak demand and establish energy management goals to reduce peak demand whenever possible.

In an ideal facility, each asset (e.g., devices, solutions, etc) which is equipped with external communication capabilities such as WiFi™, Ethernet, or RS-232/485 to report measurement and diagnostic values. In reality, facilities are equipped with a mix of devices which may or may not be remotely accessible. For this reason, management tasks such as reading asset measurements are performed on a periodic basis. Individuals who perform such tasks may be referred to as facility technicians and are often required to understand how to properly acquire the measurement data through navigating displays and interpreting values on devices from a number of different manufacturers.

SUMMARY

According to various aspects and embodiments, an energy management system is provided. The system includes a memory, at least one processor coupled to the memory, and a data acquisition management component executable by the at least one processor and configured to generate a first request to perform at least one first managed task, the first request including an identifier of at least one asset and an identifier of an attribute of the at least one asset, transmit the first request to one or more data acquisition devices, receive a first response including information descriptive of a value associated with the attribute, and generate, in response to receiving the first response and in accord with at least one energy management goal, a second request to perform at least one second managed task.

In the system, the at least one asset may be associated with machine-readable fiducial. In addition, the at least one asset may be at least one of a meter, a power distribution unit (PDU), HVAC equipment, and an uninterruptable power supply.

In the system, the at least one first managed task may be at least one of a data collection task and a maintenance task. Also, the at least one data collection task may include instructions for a user to acquire the value from the at least one asset, the value being at least one measurement. In addition, the at least one measurement may included within the information in the first response, and wherein the data acquisition management component may be further configured to generate the second request by determining whether the at least one measurement exceeds a threshold based on the at least one energy management goal, determining whether one or more additional measurements are desired, scheduling, in response to determining one or more additional measurements are desired, the at least one second managed task, and generate the second request, the second request including the identifier of the at least one asset. The data acquisition management component may be configured to schedule the at least one first managed task to be repeated periodically.

In the system, the data acquisition management component may be configured to schedule the at least one managed task to occur prior to a next repetition of the at least one first managed task. The data acquisition management component may be further configured to receive a second response, the second response including a request to postpone the at least one first managed task, and reschedule, in response to receiving the second response, the first managed task until a next period.

In the system, the first request may include location information descriptive of a physical location of the at least one asset, the location information including at least one of a GPS coordinate, a street address, a building identifier, a voice memo, a text string, a picture, a video, and a floor map representation. In addition, the data acquisition management component is further configured to identify that a data acquisition device is within proximity of the physical location of the at least one asset, determine whether the data acquisition device is available to perform the at least one first managed task, and transmit, where the data acquisition device is available, the first request to the data acquisition device. Further, the data acquisition management component is further configured to receive a second response, the second response including a request to postpone the at least one first managed task, and transmit, based on the second response, a reminder.

According to another embodiment, a method managing energy using a computer system including at least one memory and at least one processor coupled to the memory, the method includes the acts of generating a first request to perform at least one first managed task, the first request including an identifier of at least one asset and an identifier of an attribute of the at least one asset, the attribute having a value, transmitting the first request to one or more data acquisition devices, receiving a first response including information descriptive of the value, and generating, in response to receiving the first response and in accord with at least one energy management goal, a second request to perform at least one second managed task.

The act of generating the first request may further include processing location information descriptive of a physical location of the at least one asset, the location information may include at least one of a GPS coordinate, a street address, a building identifier, a voice memo, a text string, a picture, a video, and a floor map representation.

The method may further include the acts of identifying that a data acquisition device is within proximity of the physical location of the at least one asset, determining whether the data acquisition device is available to perform the at least one first managed task, and transmitting, where the data acquisition device is available, the first request to the data acquisition device.

The act of generating the first request may include generating a request to perform at least one of a data collection task and a maintenance task. In addition, generating the request to perform the at least one data collection task may include generating a request including instructions for a user to acquire the value from the at least one asset, the value being at least one measurement.

According to another embodiment, a non-transitory computer readable medium storing sequences of instructions executable by at least one processor is provided. The sequences of instructions may instruct the at least one processor to execute a process of providing energy management. The sequences of instructions including instructions may be configured to generate a first request to perform at least one first managed task, the first request including an identifier of at least one asset and an identifier of an attribute of the at least one asset, the attribute having a value, transmit the first request to one or more data acquisition devices, receive a first response including information descriptive of the value, and generate, in response to receiving the first response and in accord with at least one energy management goal, a second request to perform at least one second managed task.

In one embodiment, the first request may include location information descriptive of a physical location of the at least one asset, the information may include at least one of a GPS coordinate, a street address, a building identifier, a voice memo, a text string, a picture, a video, and a floor map representation. Further, the instructions may be further configured to identify that a data acquisition device is within proximity of the physical location of the at least one asset, determine whether the data acquisition device is available to perform that at least one first managed task, and transmit, where the data acquisition device is available, the first request to the data acquisition device.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
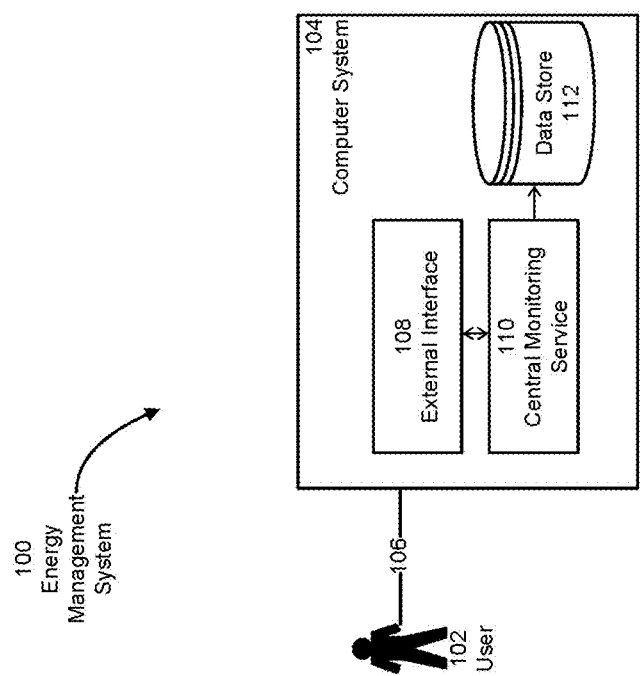
FIG. 1 is a block diagram of an energy management system according to one embodiment.

Some embodiments disclosed herein include systems and methods for optimizing energy consumption of a facility, or a portfolio of facilities. Energy consumption, as referred to herein may relate to one or more types of energy sources including Water, Air, Gas, Electricity, and Steam (WAGES). Energy managers may initially identify a particular facility, or set of facilities (i.e., portfolio) to include within a facility profile stored on a computer system. Each profile may include one or more asset identifiers which may include information descriptive of asset-specific details such as manufacturer, asset type, etc. As used herein, an asset may be any device or collection of devices within a particular facility. A collection of devices may be associated in a solution or subsystem (e.g., cooling solution, heating solution, etc). The energy manager may then establish a baseline, or benchmark, for the purpose of future analysis and comparison against later measurements. Sub-metering may be employed to understand how a building's discrete subsystems (e.g., cooling, ventilation, etc) contribute to a facility's overall energy consumption. In addition, sub-metering helps to identify system-specific reduction opportunities (e.g., maintenance, upgrades, etc). Once a baseline is established, an energy use profile may be constructed to analyze how energy use is distributed among building subsystems (e.g., heating, water, lighting, office equipment, cooling, etc). Sub-metering may provide a drill-down approach to further identify the performance of those systems to help identify further reduction opportunities. Breaking down energy consumption data by discrete systems allows for the creation of energy management goals. Once established, the overall progress of energy management goals may be measured by acquiring periodic measurements from assets and reporting those measurements to a central system. It should be understood, as used herein, an energy management goal is the objective of reducing energy costs through improved energy efficiency and energy management control.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Energy Management System

Some embodiments described herein include an energy management system for centralized collection, analysis and management of information descriptive of energy consumption for one or more facilities. As explained further below, data may be acquired from a range of assets which may include devices from different manufacturers. In at least one embodiment, data may be acquired utilizing a data acquisition device such as a smart phone. Collected data may be interpreted, analyzed, and acted upon in view of one or more energy management goals. FIG. 1 illustrates an example energy management system.

FIG. 1 includes an energy management system generally indicated at 100 that is accessed by a user 102 via a network 106. According to various examples, the energy management system is implemented using one or more computer systems, such as the programmable device 900 discussed below with reference to FIG. 9, and the distributed computer system 952 discussed below with reference to FIG. 10. In these examples, the user 102 (e.g., an energy manager) may access the energy management system 100 using the network 106 (e.g., via a smart phone or other computer system associated with the user and executing an application or web-based interface) or may directly access the computer system 104. Thus, examples of the energy management system 100 may include a variety of hardware and software components configured to perform the functions described herein and examples are not limited to a particular hardware component, software component, or particular combination thereof. It should be understood that the computer system 104 may be hosted in a cloud-based service providing energy management for any number of users for any number of facilities. For instance, the computer system 104 may be deployed on Amazon Cloud Solutions offered online by Amazon.com of Seattle, Wash.

Still referring to FIG. 1, the network 106 may include any communication network through which computer systems (i.e. send or receive) information. For example, the network 106 may be a public network, such as the internet, and may include other public or private networks such as LANs, WANs, extranets and internets. As shown, the user 102 may utilize the network 106 to exchange data with the energy management system 100. For example, the user 102 may access the energy system 100 using the network 106 or from a mobile device such as a laptop or smart phone.

In addition, information may flow between the elements, components and subsystems described herein using a variety of techniques. Such techniques include, for example, passing the information over the network 106 using standard protocols, such as TCP/IP, passing the information between modules in memory and passing the information by writing to a file, database, or some other non-volatile storage device. In addition, pointers, identifiers, or other references to information may be transmitted and received in place of, or in addition to, copies of the information. Conversely, the information may be exchanged in place of, or in addition to, pointers, identifiers, or other references to the information. Other techniques and protocols for communicating information may be used without departing from the scope of the examples disclosed herein.

In the illustrated embodiment, the energy management system 100 includes an interface 108, a central monitoring service 110, and a data store 112. As will be discussed further below, the data store 112 may be configured to store data relating to users, facilities and the assets therein. The interface 108 may be configured as a mix of available technologies and may provide one or more ways of interacting with the energy management system 100. For instance, the interface 108 may be a collection of HTML, CSS and JavaScript, such as the Adobe® PhoneGap® library offered by Adobe Systems of San Jose, Calif. In one embodiment, the energy management system 100 may be hosted in a cloud-based service. Cloud-based services may provide a server-side hosting solution with client-side library, scripts and processes. The client-side library may be deployed on a host of mobile devices including smart phones, tablets and laptops. For instance, a user may download and install a specialized 'app' which implements the client-side library and allows the users 102 to access the computer system 104 through the network 106. In at least one embodiment, the user 102 accesses the computer system 104 directly.

In the illustrated embodiment, the energy management system 100 includes a central monitoring service 110. The central monitoring service 110 may be configured to execute various energy management processes in accordance with the methods and processes of FIG. 6-8. The central monitoring service 110 may be configured to authenticate credentials stored in the data store 112. In at least one embodiment, a user 102 may have a particular set of privileges associated with their authentication data (e.g., a user name and password, a client identifier, etc). In these embodiments, a role-based privilege system may determine the privileges of a user. For instance, a user may be an energy manager for one or more sites and have administrator-level access (i.e., unlimited, or virtually unlimited privileges) to the one or more facilities represented in the energy management system 100. In contrast, a facility technician may be limited to only certain functions of the energy management system 104 (e.g., submission of measurement data). In still other embodiments, a user may be restricted to a single asset, or solution for data collection and submission.

Figure 2:
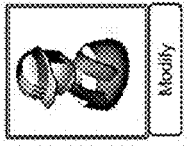
FIG. 2 is an illustration of a view of the energy management system.

Referring to FIG. 2, with further reference to FIG. 1, a view of the interface 108 is generally designated at 200. The view 200 includes a profile tab 202 and user information 204. User information 204 may be stored within the data store 112. It should be understood that the view 200 may be visualized within a wide variety of clients such as a webpage on a computer system, or 'app' on a smart phone.

The data store 112 may also be configured to store asset identifiers and associated information. Asset identifiers may be any data which identifies a physical device or solution within a facility. Within the data store 112, asset identifiers may be associated with other information related to the physical assets represented by the asset identifiers. For example, the data store 112 may include asset specific information. Asset specific information may include, but is not limited to, power rating, energy star rating, and operating characteristics (e.g., operating temperature). Asset specific data may also include information related to each individual part of the asset and may include replacement part numbers. Asset specific data may further include how-to's (documents, videos, pod-casts, etc.), official operation/user manuals (i.e., published by the manufacturer), safety manuals and other documents generated and published by the manufacturer of the asset. Also, asset specific data may include unofficial how-to's, manuals and other documents generated by individuals. For instance, user's such as the user 102 may upload a document or video detailing how to perform maintenance on a particular asset. After uploading, the user 102 may share the uploaded document or video with other users of the energy management system 100. As discussed below, official and unofficial information may be requested from the energy management system 100 during the methods and processes described below with reference to FIGS. 6-8.

In one embodiment, asset specific data may also include data entry form templates. For example, the user 102 may generate one or more data entry forms based on the templates for the purpose of cataloguing tasks performed by one or more facility technicians. For example, if a task is related to acquiring a measurement from an asset, a data entry form may be visualized on a mobile computing device used by the user 102. The user 102 may then enter one or more values into the data entry form. In one embodiment, a user uploads the data entered into the form to the computer system 104 via the network 106. As discussed below with reference to FIGS. 6 and 8, the one or more values may be interpreted and/or validated prior to uploading the one or more values.

Asset identifiers may be encoded into machine-readable codes (or fiducials) such as one- and two-dimensional bar codes and affixed to assets within a facility. One example of a two-dimensional bar code is a Quick Response (QR) code developed by Denso Wave Inc. of Chita-gun, Aichi, Japan. QR codes are an improvement over the conventional one-dimensional bar codes because more data can be encoded in the pattern over a two-dimensional surface. In addition, QR codes include robust error correction that makes them ideal in scenarios where light conditions or quality of a particular display may impact readability of the QR code. Among other fields, QR codes are widely used in industrial management, such as for asset identification, inventory management and diagnostics. As will be further discussed below with reference to FIG. 8, the user 102 may identify an asset by scanning a fiducial associated with the asset.

Figure 3:
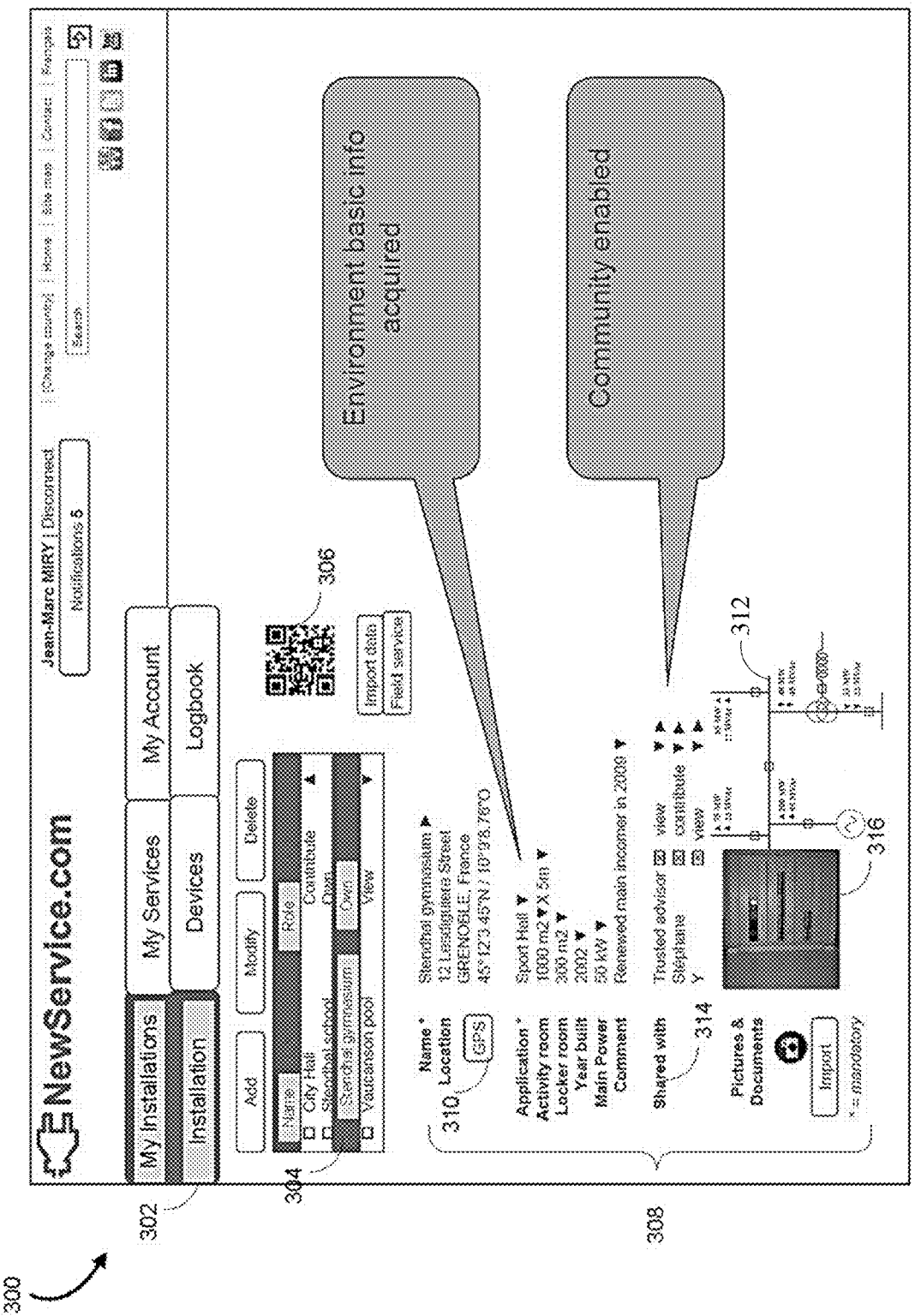
FIG. 3 is another illustration of a view of the energy management system.

Referring now to FIG. 3, with continued reference to FIG. 1, one embodiment illustrating an asset management view provided by the interface 108 is generally designed at 300. The view 300 includes an installation (facility) tab 302, an asset list 304, an asset fiducial 306, and asset information 308. Within the asset information 308 area is a physical asset location 310, an asset schematic 312, a "shared with" indicator 314, and an asset picture 316. Within this view the user 102 may select from a list of assets included in the asset list 304. In other embodiments, the asset list 304 may be visualized in other ways. Once selected, asset information 308 may be provided by the computer system 104. Asset information may include the asset fiducial 306. As discussed above, the asset fiducial 306 may be identical to the fiducial affixed to the physical asset. In the embodiment shown, the asset fiducial 306 is shown as a QR code; however, in other embodiments the asset fiducial 308 may be a different type of machine readable code. The asset information 308 may further include asset-specific information discussed above with reference to FIG. 2.

In the illustrated embodiment, GPS information 310 and physical street address information for the facility in which the asset is physically housed or otherwise associated is visualized. In other embodiments, a map may be visualized based on GPS information 310 and/or the physical street address. Asset information 308 further includes information pertaining to the asset's location within the facility (referred to as an Application within FIG. 3). In one embodiment, the asset information 308 is shared with one or more users of the energy management system 100. For instance, in the illustrated embodiment, the "shared with" indicator 314 indicates that other users have access to the device information 308. Also in the illustrated embodiment includes an asset image 316 and an asset schematic 312. As discussed below with reference to FIG. 6, asset information 308 may be modified by the user 102 depending on their privileges within the energy management system 100.

Figure 4:
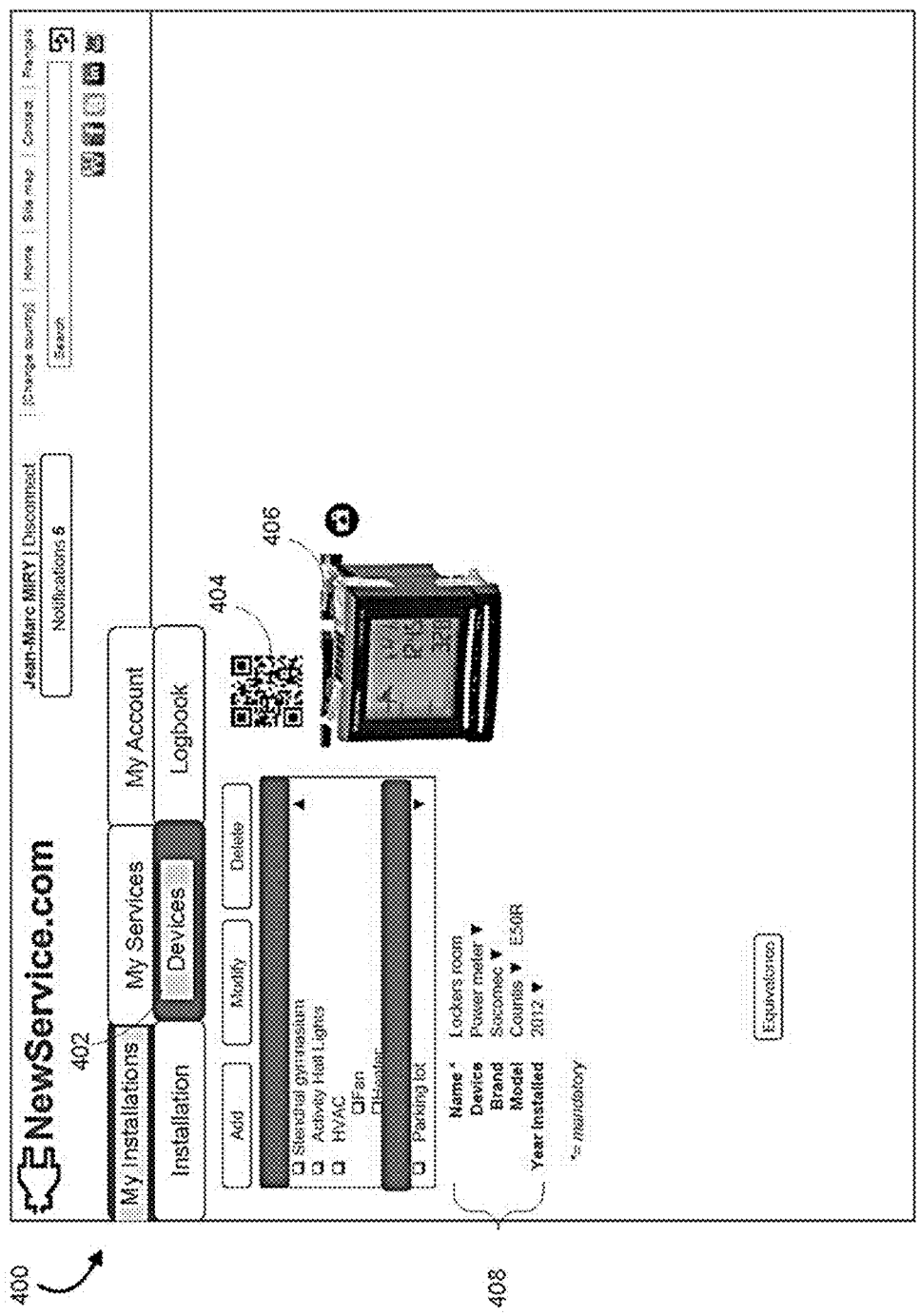
FIG. 4 is still another illustration of a view of the energy management system.

Referring now to FIG. 4, with continued reference to FIG. 1, one embodiment including an asset management view is generally designed at 400. The view 400 illustrates information stored in the data store 112 according to one embodiment. The view 400 includes a devices tab 402, an asset fiducial 404, an asset image 406, and asset information 408. The view 400 illustrates how the computer system 104 may be configured to visualized asset information.

Figure 5:
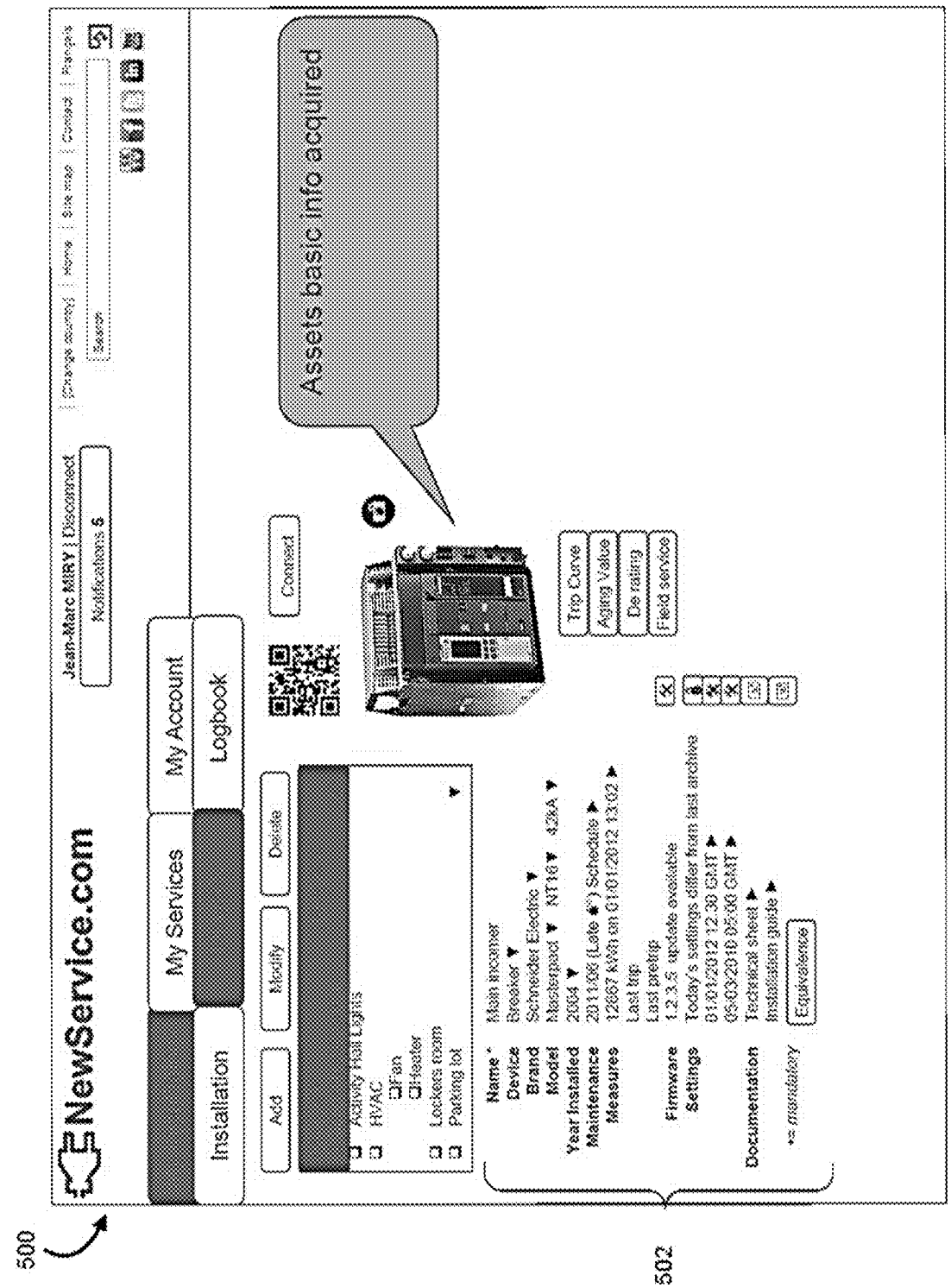
FIG. 5 is still yet another illustration of a view of the energy management system.

Referring now to FIG. 5, with continued reference to FIG. 1, one embodiment illustrating an asset management view with extended asset information 502 is generally designed at 500. The view 500 illustrates how the computer system 104 may be configured to visualized asset information periodically acquired by one or more users in accordance with the methods and processes discussed below with reference to FIGS. 6-8.

The data store 112 may also store raw and interpreted data collected from assets within a facility. Raw data may be any value which may be remotely acquired from an asset, such as the utility meter 900 of FIG. 9, or acquired locally at the physical asset. Values may include, but are not limited to, asset information (e.g., the asset information 502), measurement values, diagnostic codes and status indicators. Measurement values may also be provided by sensors installed in, or outside, a facility and the sensors may collect environmental data such as temperature and humidity. As discussed above, tracking WAGES requires a plurality of measurement types to be acquired, analyzed and interpreted. A non-limiting list of example measurements pertinent to WAGES includes power consumption (e.g., KWh) measurements, volume measurements (e.g., water flow), environmental measurements (e.g., temperature, humidity, barometric pressure), air flow, etc.

Energy Management Goals

As discussed above, an energy management goal is the objective of reducing energy costs through improved energy efficiency and energy management control. Within the context of the energy management system 100, one or more goals may be defined by users, such as the user 102 in the form of rules. In one embodiment, one or more rules may aid in meeting the energy management goals of one or more facilities. For example, if the user 102 sets a goal of reducing the overall percentage of a facility by a certain percent, a rule may be created to establish, measure, and tack progress towards meeting the goal. Rules may be defined for an entire portfolio of facilities, a single facility, or for any asset therein. Further, rules may define schedules, thresholds and actions to be taken.

When the user 102 generates a rule within the energy management system 100, the rule may be analyzed by the energy management system 100 and used to track, maintain and report progress toward energy management goals. A rule may define one or more logical propositions. The logical proposition may be, for example, a logical implication. The logical proposition may include one or more logical operators. A non-limiting list of the logical operators that may be used in these logical propositions includes "and", "or", "xor" and "andnot." The logical propositions may include other operators as well. For example, in one embodiment comparison operators, such as "<", ">" and "=" may be used. In one embodiment, the energy management system 100 may utilize the logical propositions to determine if further action is required. For example, a rule may include a threshold measurement value and additional criteria to be met (an AND proposition) before further action should be taken. In this example, the measurement value may be a temperature value and the additional criteria may be the amount of time since a filter has last been replaced. If both of the values exceed the limits defined by the rule, an action may be executed by the energy management system 100. Actions may include, but are not limited to, the scheduling of managed tasks to be performed by facility technicians, alerts, and logging operations.

In one embodiment, actions are used by the energy management system to insure that energy management goals are met. The energy management system 100 may perform an action based on a rule, or based on user interaction. The scheduling of managed tasks will be discussed with further reference to the methods and processes of FIGS. 6-8. Alerts may be in the form of pop-ups, emails, short messaging service (SMS), a physical contact closure, or phone calls. Logging operations may include extended logging operations based on measurements received from an asset. For example, if an asset is remotely accessible (e.g., via TCP/IP) then an extended logging operation may be performed whereby a datastream may be recorded to the data store 112 (FIG. 1) if a logical proposition within a rule is met (e.g., a temperature value being reached).

Energy Management Processes

Figure 6:
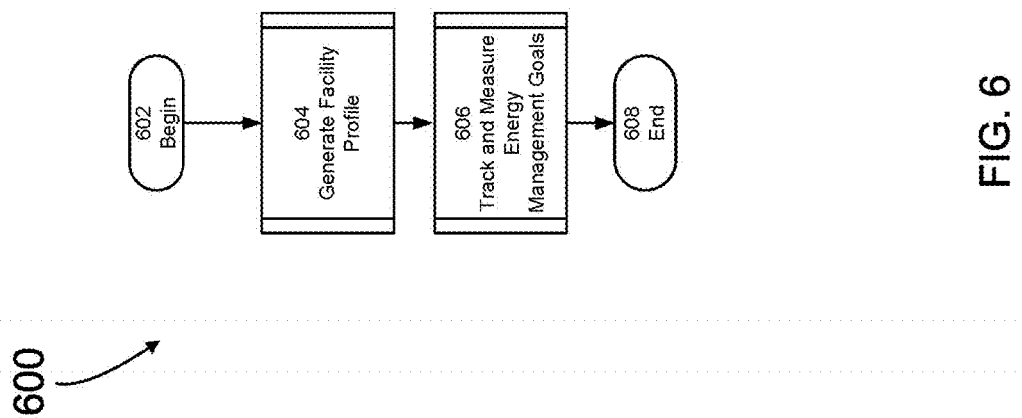
FIG. 6 is a method of operating the energy management system.

As discussed above with reference to FIG. 1, some embodiments are directed to an energy management system 100 (FIG. 1) that performs processes directed to energy management for one or more facilities. Although the proceeding examples are directed to a single facility, it should be appreciated that the examples are not limited to the energy management of a single facility. One example of the processes performed by the energy management system 100 (FIG. 1) is illustrated in FIG. 6. According to this example, the energy management process 600 includes the acts of generating a facility profile, and tracking and measuring energy management goals. The energy management process 600 may be executed by the computer system 104 described above with reference to FIG. 1. Process 600 begins at 602.

In act 604, one or more users, such as the user 102 (FIG. 1) accesses the computer system 104 and generates a facility profile. As discussed further below with reference to FIG. 7, a facility profile may include, or otherwise be associated with asset information, baseline measurements, an energy profile, and one or more energy management goals.

In act 606, the overall progress toward the energy management goals are tracked, maintained, and reported on by the energy management system 100 (FIG. 1). In some embodiments, the central monitoring service 110 (FIG. 1) of the energy management system 100 (FIG. 1) analyzes the one or more rules representing the energy management goals and executes actions as necessary to achieve the desired energy management goals. In these embodiments the central monitoring service 110 (FIG. 1) executes periodic requests which are transmitted to users, such as the user 102 (FIG. 1). As discussed in further detail below with reference to FIG. 8, the computer system 104 may transmit a request to a user (i.e., to a computer system associated with and operated by the user). The requests may include information regarding one or more asset identifiers and one or more managed tasks to be performed or managed by a user. The computer system 104 may then assist the user in locating the identified asset, and assist with performing the one or more managed tasks. For example, requests may include tasks such as recordation of measurement values from one or more assets. In this example, the measurement values may be entered into the data entry forms, such as the data entry forms discussed above with reference to FIG. 3.

Figure 7:
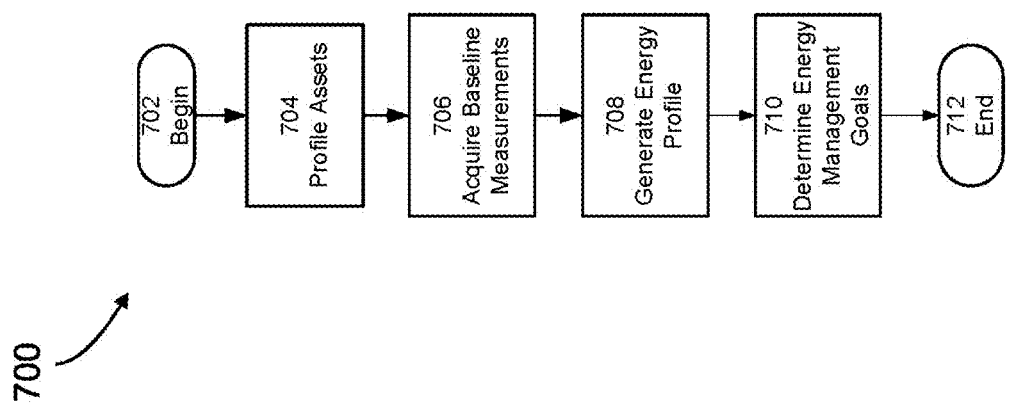
FIG. 7 is a method for determining a facility profile according to various embodiments.
Figure 8:
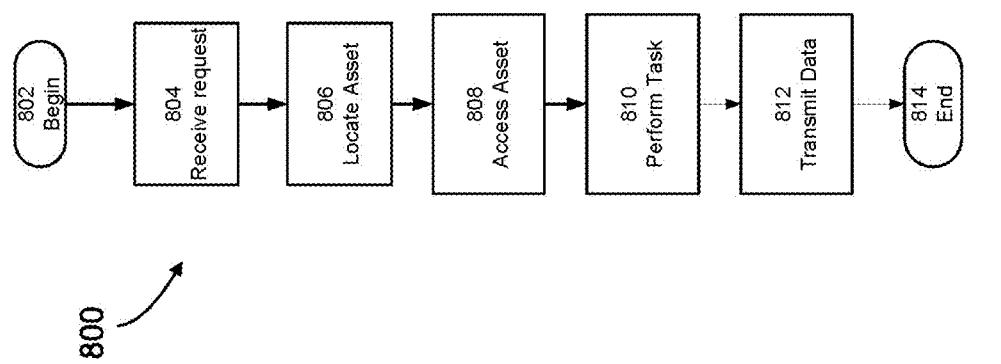
FIG. 8 is a method for tracking and measuring energy management goals accord to various embodiments.

As described above with reference to act 604 one or more users, such as the user 102 (FIG. 1) accesses the energy management system 100 and generates a facility profile. One example of the process of generating a facility profile is illustrated in FIG. 7. According to this example, the process 700 includes the acts of profiling assets, acquiring baseline measurements, generating an energy profile, and determining one or more energy management goals that may be tracked via one or more managed tasks that collect one or more measurement values (rules). Process 700 begins at act 702.

In act 704, a user, such as the user 102 (FIG. 1), accesses the energy management system 100 (FIG. 1) via the network 106 (FIG. 1). The user 102 may provide one or more credentials to the energy management system 100. As discussed above with reference to FIG. 1, a role-base privilege system may determine the rights and privileges of a user accessing the energy management system. In one embodiment, only a user with "energy manager" (i.e., administrative) privileges may generate a facility profile. In other embodiments, different roles may be configured that allow a user other than an energy manager sufficient privileges to perform the functions necessary to generate a facility profile. It should be appreciated that the user 102 (FIG. 1) may access the energy management system 100 via a smartphone running an 'app,' a webpage, or the energy management system 100 directly. The user 102 may conduct one or more functions of the energy management system 100 using one or more views, such as the views illustrated in FIGS. 3-5.

In one embodiment the user 102 utilizes one or more views (e.g., FIGS. 3-5) to profile assets within the energy management system 100. In this embodiment the user may manually enter asset information (e.g., asset identifiers), or may select from a list of potential assets. As discussed above with reference to FIG. 1, the energy management system 100 may be hosted in a cloud-based hosting service. A cloud-based hosting service may enable the sharing of pre-defined assets within the data store 112 (FIG. 1). As discussed above with reference to FIGS. 1-2, assets within a facility are represented by asset identifiers within the data store 112. To this end, the user 102 may associate and store asset specific data with the asset identifier. The asset specific data may also include one or more data entry form templates.

In at least one embodiment, the energy management system may acquire asset information from one or more users, such as users with the role of facility technician. For instance, a request asking that technicians identify assets within a given facility may advantageously "crowd source" the asset identification. Users may receive the request and satisfy the request in accordance with the process discussed below with reference to FIG. 8.

In act 706, baseline measurements for the assets identified within the energy management system 100 are acquired. In one embodiment, baseline measurements may be entered manually by the energy manager. In other embodiments, the energy management system 100 may transmit requests to one or more users which include tasks associated with the collection of baseline measurements. Users may receive the request and satisfy the request in accordance with the process discussed below with reference to FIG. 8.

In act 708, identified assets and their respective baseline measurements may be used to generate an energy profile. An energy profile details the amount of energy used by each identified asset, and thus, the energy profile of a facility. To this end, an energy profile may include values indicating expected energy consumption (e.g., apparent) versus real energy consumption. In addition, an energy profile may delineate solutions (e.g., discrete subsystems) within a facility to enable analysis of energy consumption per subsystem. These subsystems may be sub-metered and targeted, measured, analyzed and tracked individually for reduction opportunities. It should be appreciated that an energy profile may be updated over time with the addition and subtraction of assets and by the ongoing process of tracking energy management goals in accordance with the process 600 of FIG. 6.

In act 710, one or more energy management goals are determined. As discussed above with reference to FIG. 1, an energy management goal is the objective of reducing energy costs through improved energy efficiency and energy management control. Within the energy management system 100, energy management goals are represented by one or more rules. As discussed above, rules may define schedules, thresholds and actions to be taken.

Processes in accord with the process 700 enable one or more users of the energy management system 100 (FIG. 1) to generate and store a facility profile within the date store 112 (FIG. 1). The central monitoring service 110 (FIG. 1) of the energy management system 100 may then track and measure energy management goals associated with the facility profile. As discussed below with reference to FIG. 8, the energy management system 100 may transmit requests to one or more users to assist in the periodic performance of tasks related to assets within a facility. In one embodiment, requests may be scheduled on a periodic basis, or may be scheduled on-demand. In at least one embodiment, the response to a request may be the basis for the creation and transmission of additional requests. For instance, a particular measurement entered into a data entry form by a user may exceed a threshold defined by one or more rules. In this example, an additional request may be issued which could include tasks such as replacing a filter, adjusting a thermostat schedule, or acquiring additional measurements. In still other embodiments, a response to a request may result in an increased frequency for future requests. For example, a previous measurement value may indicate that additional measurements should be taken with greater frequency. In this example, the energy management system 100 may schedule a task to be performed on a daily basis instead of a default frequency which may be included within one or more rules.

As discussed above, requests are transmitted to one or more users based on energy management goals and their associated rules. Process 800 illustrates an example how the energy management system 100 transmits requests to users, and aides in the management of tasks associated with assets of a facility in furtherance of energy management goals. The process 800 includes the acts of receiving a request, locating one or more assets identified in the request, accessing the one or more assets, performing one or more tasks as requested by the energy management system, and transmitting data back to the energy management system in response to the request. Process 800 begins at act 802.

In act 804, a user, such as the user 102 of FIG. 1, receives a request from the computer system 104 over the network 106 via a smartphone or other mobile computing device. In one embodiment, the request is a result of a scheduled action based on one or more rules associated with a facility. For instance, the request may be based on a periodic (e.g., monthly, weekly, etc.) task related to the acquisition of measurement values for one or more assets. In other embodiments, the request is a result of the user 102 being in proximity of a particular asset. For example, if the user 102 is equipped with a smart phone which is GPS enabled, then an 'app' running on the smart phone may communicate with the energy management system 100 (FIG. 1) via the network 106 and transmit GPS coordinates of the user 102. The energy management system 100 may then determine if one or more requests should be transmitted to the user 102 based on the GPS coordinates of the user 102 and the GPS (or physical address information) associated with the asset within the energy management system. In one embodiment, the user 102 may receive the request and decline to perform the tasks associated with the request. In this embodiment, the user may indicate an alternate date in which the request may be satisfied by the user. The energy management system 100 may then schedule a subsequent request based on the alternate date in which the user indicated availability to satisfy the request.

In act 806, an asset is located based on asset-specific information stored within the data store 112 (FIG. 1). In one embodiment, the user 102 requests asset-specific information via one or more views, such as the views illustrated in FIGS. 3-5. In this embodiment, the user may use a physical street address, GPS coordinates, or other information related to the location of a facility and one or more assets located therein. Asset-specific information may include information relating to the physical location of an asset within a particular facility. For example a room and enclosure may be identified. As discussed above with reference to FIGS. 3-5, an asset image may also aid in the identification of where an asset is located.

In one embodiment, an asset is located and verified based on an asset identifier affixed to the asset, such as a fiducial as discussed above with reference to FIG. 1. A user may capture an image of a fiducial using a camera-enabled smart-phone. In one embodiment, the fiducial may be decoded by the smartphone from the captured image. In another embodiment, the captured image is transmitted to the energy management system 102 for decoding by the energy management system 102. Once an asset has been located, and verified as the correct asset, the process continues to act 808.

In act 808, the asset is accessed by the user 102 to perform one or more tasks associated with the received request. As discussed above with reference to FIG. 1, the one or more tasks may be related to data acquisition (e.g., measurements) and/or maintenance. For instance, the request may be directed to recording a measurement from a roof top HVAC unit as well as replacing a filter of the HVAC unit.

In at least one embodiment, measurement values may be environmental and may be used and interpreted by the computer system 104. For example, the computer system 104 may receive environmental measurements (e.g., temperature, humidity, etc) from one or more internal and external sensors. The environmental measurements may cause the computer system 104 to request one or more tasks be performed. For example, if a certain temperature exceeds a particular threshold over a period of time, a maintenance task may be requested such as checking a condensate pan, filter, etc.

In one embodiment, the user 102 may be required to access an asset for which they have little or no training. For example, if the user 102 is a facility technician who is responsible for many devices within one or more facilities, it may be unlikely that the facility technician is sufficiently trained regarding all possible assets with which they may interact. In this example, the energy management system 100 may provide guidance in properly accessing the asset, navigating a display of the asset, interpreting relevant data, and recording the relevant data for upload to the energy management system 100. In one embodiment, a user may request how-tos, manuals, and videos for assistance in performing a requested task. As discussed above with reference to FIG. 1, various official and un-official asset-specific information may be stored and retrieved from the data store 112 of the energy management system 100.

In act 810, the user 102 performs one or more tasks on one or more assets identified in the request. As discussed above in act 808, the user 102 may request asset-specific information to aid in performing the one or more tasks. In one embodiment, asset-specific information may be used to provide an augmented-reality approach to accessing an asset and navigating a display of the asset. For instance, the user 102 may utilize a camera-enabled smart phone to capture images of the display. In one embodiment, an app executed on the smartphone assists a user in aligning the camera to properly capture one or more images (i.e., a square, or other shape visualized on the smartphone's display). In this embodiment, the captured images may be analyzed by an 'app' executed on the smart phone, such as an app discussed above with reference to FIG. 1, or by the energy management system 100. The user 102 may then be provided with asset-specific information pertinent to the requested task. For instance, if a particular measurement is requested then an arrow or other symbol may be overlaid on to the live images viewed on the smartphone. The overlaid information may identify the correct measurement to record, the proper button to push, etc.

In one embodiment, the user 102 performs the one or more tasks and records one or more values within data entry forms, such as the data entry forms based on data entry form templates stored in the data store 112 discussed above with reference to FIGS. 3-5. As discussed above in act 810, the user 102 may receive asset-specific which may assist in entering one or more values into the data entry form. For instance, a conversion guide may be provided which assists a user in converting from one measurement value to another (e.g., kW to kWh).

In act 812, the one or more values are transmitted to the energy management system 100. In one embodiment, the values are transmitted via the network 106 (FIG. 1). In another embodiment, the values may be uploaded from a thumb-drive or entered manually by the user 102 in one or more views of the energy management system 100, such as the views illustrated in FIGS. 3-5.

In one embodiment, the one or more values are interpreted, validated, analyzed and stored by the energy management system 100. In one embodiment, interpretation may be determining an equivalent measurement type for the one or more values. For instance, a particular asset may include one or more manufacturer-specific measurement types which the energy management system 100 identifies as equivalent to other measurement types. This enables the energy management system 100 to interpret values in a manufacturer-agnostic way and minimizes the necessity of an energy manager having to determine measurement equivalency.

It should be appreciated that data validation and analysis is an important aspect of tracking whether energy management goals are being achieved. In one embodiment, the energy management system 100 validates the one or more values received in response to a request. For instance, if a rollover counter has been previously measured then subsequent measurements will be validated against the previous measurements. If a subsequent measurement indicates that a rollover has occurred (i.e., a subsequent measurement is less than the previous measurement) then the computer system 104 may request additional measurement tasks to be performed. As discussed above with regards to FIG. 1, the additional measurement requests may be at a higher frequency than a default frequency within a particular rule.

In one embodiment, the values received in responses to requests are analyzed to determine if energy management goals are being achieved. For instance, the responses received from one or more users over a period of time for a given facility may be combined to determine a snapshot of the facility's overall energy consumption. In one embodiment, the analysis of the combined responses may lessen the frequency of subsequent measurements. For instance, if a particular energy management goal is reached then measurements may be less frequent until one or more measurement values indicate that energy consumption is on the rise. In act 814 the process 800 ends.

Programmable Device

As discussed above with regard to FIG. 1, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, power and resource monitoring devices, protection relays, programmable logic controllers, and utility meters, such as a utility meter 900 as illustrated in FIG. 9.

Figure 9:
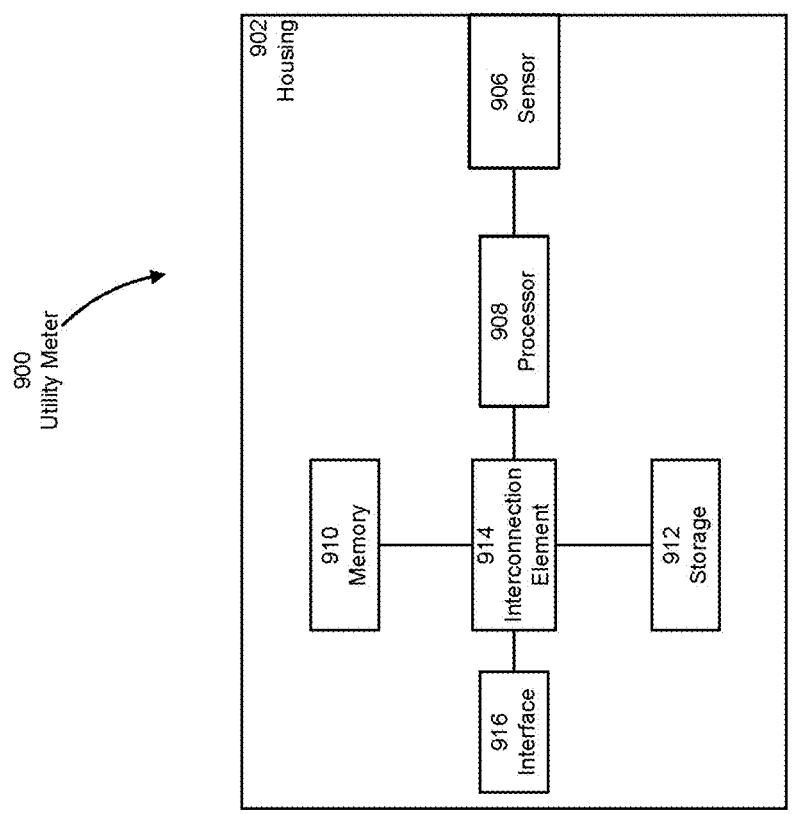
FIG. 9 is a block diagram of one example of a distributed computer system that may be used to perform processes and functions disclosed herein.

As shown in FIG. 9, the utility meter 900 comprises a housing 902 that includes, a sensor 906, a processor 908, a memory 910, a data storage device 912, an interconnection element 914, and an interface 916. To implement at least some of the aspects, functions, and processes disclosed herein, the processor 908 performs a series of instructions that result in manipulated data. The processor 908 may be any type of processor, multiprocessor, or controller.

The memory 910 stores programs and data during operation of the utility meter 900. Thus, the memory 910 include any device for storing data, such as a disk drive or other non-volatile storage device, but typically includes a relatively high performance, volatile, random access memory such as a dynamic random access memory (DRAM) or static memory (SRAM). Various embodiments may organize the memory 910 into particularized and, in some cases, unique structures to perform the functions disclosed herein. These data structures may be sized and organized to store values for particular data and types of data.

As shown in FIG. 9, several of the components of the utility meter 900 are coupled to the interconnection element 914. The interconnection element 914 may include any communication coupling between components of the utility meter, such as one or more physical busses subscribing to one or more specialized or standard computing bus technologies such as IDE, SCSI, and PCI. The interconnection element 914 enables communications, such as data and instructions, to be exchanged between components of the utility meter 900.

The utility meter 900 also includes one or more interface devices 916 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 900 to exchange information with and to communicate with external entities, such as users and other systems.

The data storage device 912 includes a computer readable and writeable nonvolatile, or non-transitory, data storage medium in which instructions are stored that define a program or other object that is executed by the processor 908. The data storage 912 also may include information that is recorded, on or in, the medium, and that is processed by the processor 908 during execution of the program. More specifically, the information may be stored in one or more data structures specifically configured to conserve storage space or increase data exchange performance. The instructions may be persistently stored as encoded signals, and the instructions may cause the processor 908 to perform any of the functions described herein. The medium may, for example, be optical disk, magnetic disk or flash memory, among others.

As shown in FIG. 9, the sensor 906 is coupled to the processor 908. The sensor 906 includes an analog sensor and analog to digital converter to provide the processor 908 with a digital signal that represents a quantity of flow (e.g. usage) of a utility as detected by the analog sensor. The particular configuration of the sensor 906 varies depending on the utility being measured by the utility meter 900. For example, in an embodiment including a meter that measures electricity, the sensor 906 includes inputs for single phase or three phase power and records periodic measurements of one or more identified characteristics (e.g., power, voltage, current, etc.) of the electric circuit via the inputs. Upon receipt of these periodic measurements, the processor 908 stores information descriptive of the measurements and the times that the measurements were taken in the data storage element 912. Further, in some embodiments, the processor 908 subsequently transmits the stored information descriptive of the measurements to an external entity via a network interface included in the interface devices 916.

Some embodiments of the utility meter 900 include operational parameters that may be configured via protected functionality provided by the utility meter 900. These operational parameters may be used to configure CT/PT ratio, system type, demand calculations, I/O setup, onboard data logging, onboard waveform capture, and onboard alarming.

Although the utility meter 900 is shown by way of example as one type of utility meter upon which various aspects and functions may be practiced, aspects and functions are not limited to being implemented on the utility meter 900 as shown in FIG. 9. Various aspects and functions may be practiced on one or more utility meters having a different architectures or components than that shown in FIG. 9. For instance, the utility meter 900 may include specially programmed, special-purpose hardware, such as an application-specific integrated circuit (ASIC) tailored to perform one or more particular operations disclosed herein.

In some examples, the components of the utility meter 900 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 10:
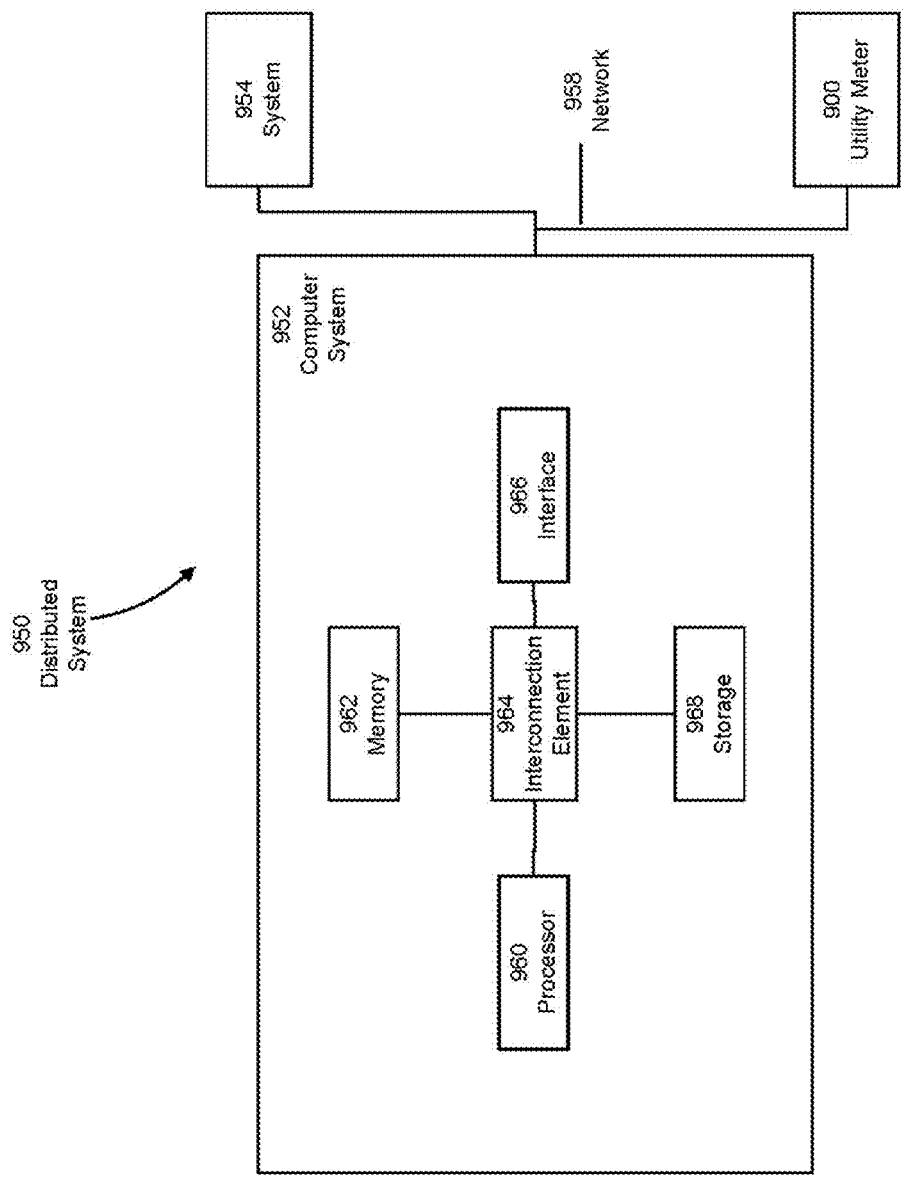
FIG. 10 is a block diagram of an example of a computer system that executes processes and functions disclosed herein.

Referring to FIG. 10, there is illustrated a block diagram of a distributed computer system 950, in which various aspects and functions are practiced. As shown, the distributed computer system 950 includes one more computer systems that exchange information. More specifically, the distributed computer system 950 includes computer systems 952, 954 and 956. As shown, the computer systems 952, 954 and 956 are interconnected by, and may exchange data through, a communication network 958. The network 958 may include any communication network through which computer systems may exchange data. To exchange data using the network 958, the computer systems 952, 954 and 900 and the network 958 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 952, 954 and 956 may transmit data via the network 958 using a variety of security measures including, for example, TLS, SSL or VPN. While the distributed computer system 950 illustrates three networked computer systems, the distributed computer system 950 is not so limited and may include any number of computer systems and computing devices, networked using any medium and communication protocol.

As illustrated in FIG. 10, the computer system 952 includes a processor 960, a memory 962, an interconnection element 964, an interface 966 and data storage element 968. To implement at least some of the aspects, functions and processes disclosed herein, the processor 960 performs a series of instructions that result in manipulated data. The processor 960 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 960 is connected to other system components, including one or more memory devices 962, by the interconnection element 964.

The memory 962 stores programs and data during operation of the computer system 952. Thus, the memory 962 may be a relatively high performance, volatile, random access memory such as a dynamic random access memory ("DRAM") or static memory ("SRAM"). However, the memory 962 may include any device for storing data, such as a disk drive or other nonvolatile storage device. Various examples may organize the memory 962 into particularized and, in some cases, unique structures to perform the functions disclosed herein. These data structures may be sized and organized to store values for particular data and types of data.

Components of the computer system 952 are coupled by an interconnection element such as the interconnection element 964. The interconnection element 964 may include one or more physical busses, for example, busses between components that are integrated within a same machine, but may include any communication coupling between system elements including specialized or standard computing bus technologies such as IDE, SCSI, PCI and InfiniBand. The interconnection element 964 enables communications, such as data and instructions, to be exchanged between system components of the computer system 952.

The computer system 952 also includes one or more interface devices 966 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 952 to exchange information and to communicate with external entities, such as users and other systems.

The data storage element 968 includes a computer readable and writeable nonvolatile, or non-transitory, data storage medium in which instructions are stored that define a program or other object that is executed by the processor 960. The data storage element 968 also may include information that is recorded, on or in, the medium, and that is processed by the processor 960 during execution of the program. More specifically, the information may be stored in one or more data structures specifically configured to conserve storage space or increase data exchange performance. The instructions may be persistently stored as encoded signals, and the instructions may cause the processor 960 to perform any of the functions described herein. The medium may, for example, be optical disk, magnetic disk or flash memory, among others. In operation, the processor 960 or some other controller causes data to be read from the nonvolatile recording medium into another memory, such as the memory 962, that allows for faster access to the information by the processor 960 than does the storage medium included in the data storage element 968. The memory may be located in the data storage element 968 or in the memory 962, however, the processor 960 manipulates the data within the memory, and then copies the data to the storage medium associated with the data storage element 968 after processing is completed. A variety of components may manage data movement between the storage medium and other memory elements and examples are not limited to particular data management components. Further, examples are not limited to a particular memory system or data storage system.

Although the computer system 952 is shown by way of example as one type of computer system upon which various aspects and functions may be practiced, aspects and functions are not limited to being implemented on the computer system 952 as shown in FIG. 10. Various aspects and functions may be practiced on one or more computers having a different architectures or components than that shown in FIG. 10. For instance, the computer system 952 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 952 may be a computer system including an operating system that manages at least a portion of the hardware elements included in the computer system 952. In some examples, a processor or controller, such as the processor 960, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 960 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An energy management system, the energy management system comprising:
    a memory configured to store a facility profile;
    at least one processor coupled to the memory; and
    a data acquisition management component executable by the at least one processor and configured to:
        generate a first request to perform at least one first managed task, the first request including an identifier of at least one asset and an identifier of an attribute of the at least one asset, the first request including location information descriptive of a physical location of the at least one asset;
        identify a mobile data acquisition device within a proximity of the physical location of the at least one asset;
        transmit the first request to the identified mobile data acquisition device;
        receive a first response from the identified mobile data acquisition device including information descriptive of a value associated with the attribute;
        generate, in response to receiving the first response and in accord with at least one energy management goal, a second request to perform at least one second managed task;
        transmit the second request to the identified mobile data acquisition device;
        receive a second response from the identified mobile data acquisition device; and
        update the facility profile in response to receiving the second response.

2. The system of claim 1, wherein the at least one asset is associated with a machine-readable fiducial, and wherein the first request includes information related to the machine-readable fiducial.

3. The system of claim 1, wherein the at least one asset is at least one of a meter, a power distribution unit (PDU), HVAC equipment, and an uninterruptable power supply.

4. The system of claim 1, wherein the at least one first managed task is at least one of a data collection task and a maintenance task.

5. The system of claim 4, wherein the at least one data collection task includes instructions for a user to acquire the value from the at least one asset, the value being at least one measurement.

6. The system of claim 5, wherein the at least one measurement is included within the information in the first response, and wherein the data acquisition management component is further configured to generate the second request by:
   determining whether the at least one measurement exceeds a threshold based on the at least one energy management goal;
   determining whether one or more additional measurements are desired;
   scheduling, in response to determining one or more additional measurements are desired, the at least one second managed task; and
   generate the second request, the second request including the identifier of the at least one asset.

7. The system of claim 6, wherein the data acquisition management component is configured to schedule the at least one first managed task to be repeated periodically.

8. The system of claim 7, wherein the data acquisition management component is configured to schedule the at least one managed task to occur prior to a next repetition of the at least one first managed task.

9. The system of claim 7, wherein the data acquisition management component is further configured to:
   receive the second response, the second response including a request to postpone the at least one first managed task; and
   reschedule, in response to receiving the second response, the first managed task until a next period.

10. The system of claim 1, wherein the location information includes at least one of a GPS coordinate, a street address, a building identifier, a voice memo, a text string, a picture, a video, and a floor map representation.

11. The system of claim 10, wherein the data acquisition management component is further configured to:
   determine whether the identified mobile data acquisition device is available to perform the at least one first managed task; and
   transmit, where the identified mobile data acquisition device is available, the first request to the identified data acquisition device.

12. The system of claim 11, wherein
   the second response includes a request to postpone the at least one first managed task; and
   transmit, based on the second response, a reminder.

13. A method managing energy using a computer system including at least one memory configured to store a facility profile and at least one processor coupled to the memory, the method comprising:
   generating a first request to perform at least one first managed task, the first request including an identifier of at least one asset and an identifier of an attribute of the at least one asset, the first request including location information descriptive of a physical location of the at least one asset;
   identifying a mobile data acquisition device within a proximity of the physical location of the at least one asset;
   transmitting the first request to the identified mobile data acquisition device;
   receiving from the identified mobile data acquisition device a first response including information descriptive of a value associated with the attribute;
   generating, in response to receiving the first response and in accord with at least one energy management goal, a second request to perform at least one second managed task;
   transmitting the second request to the identified mobile data acquisition device;
   receiving a second response from the identified mobile data acquisition device; and
   updating the facility profile in response to receiving the second response.

14. The method of claim 13, wherein the location information includes at least one of a GPS coordinate, a street address, a building identifier, a voice memo, a text string, a picture, a video, and a floor map representation.

15. The method of claim 14, wherein the method further comprises:
   determining whether the identified mobile data acquisition device is available to perform the at least one first managed task; and
   transmitting, where the identified mobile data acquisition device is available, the first request to the identified mobile data acquisition device.

16. The method of claim 13, wherein generating the first request includes generating a request to perform at least one of a data collection task and a maintenance task.

17. The method of claim 16, wherein generating the request to perform the at least one data collection task includes generating a request including instructions for a user to acquire the value from the at least one asset, the value being at least one measurement.

18. A non-transitory computer readable medium storing sequences of instructions executable by at least one processor, the sequences of instructions instructing the at least one processor to execute a process of providing energy management, the sequences of instructions including instructions configured to:
   store a facility profile in a memory;
   generate a first request to perform at least one first managed task, the first request including an identifier of at least one asset and an identifier of an attribute of the at least one asset, and the first request including location information descriptive of a physical location of the at least one asset;
   identify a mobile data acquisition device within a proximity of the physical location of the at least one asset;
   transmit the first request to the identified mobile data acquisition device;
   receive from the identified mobile data acquisition device a first response including information descriptive of a value associated with the attribute;
   generate, in response to receiving the first response and in accord with at least one energy management goal, a second request to perform at least one second managed task;
   transmit the second request to the identified mobile data acquisition device;
   receive a second response from the identified mobile data acquisition device; and update the facility profile in response to receiving the second response.

19. The computer readable medium of claim 18, wherein the location information includes at least one of a GPS coordinate, a street address, a building identifier, a voice memo, a text string, a picture, a video, and a floor map representation.

20. The computer readable medium of claim 19, wherein instructions are further configured to:
   determine whether the identified mobile data acquisition device is available to perform that at least one first managed task; and
   transmit, where the identified mobile data acquisition device is available, the first request to the identified mobile data acquisition device.

\* \* \* \* \*